Figure 1:
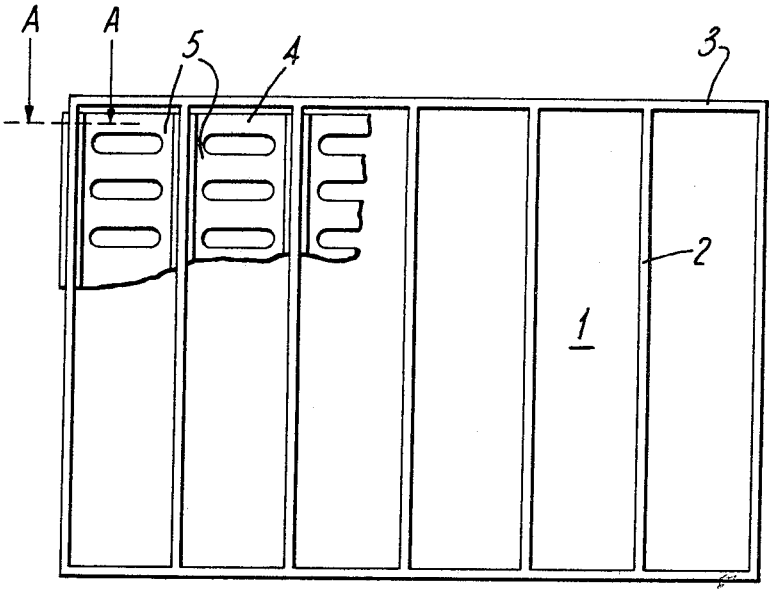
Figure 4:
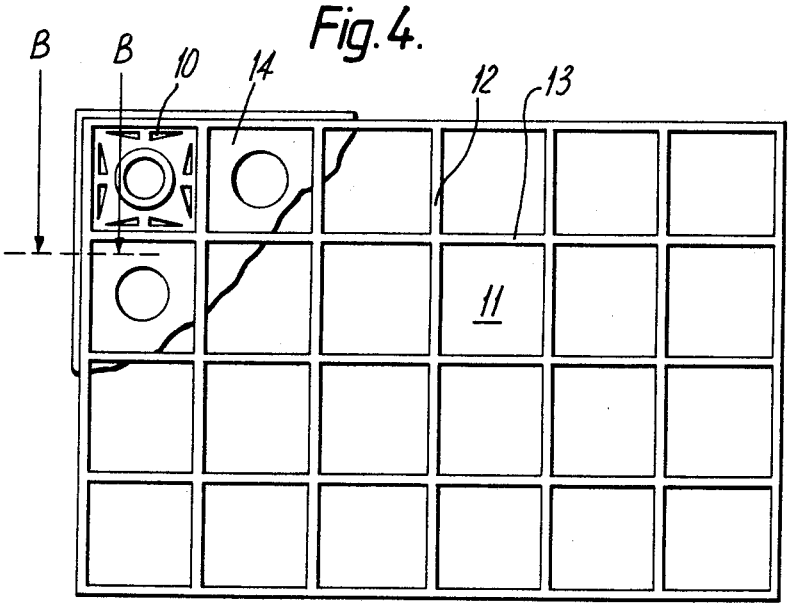
Figures 2, 3:
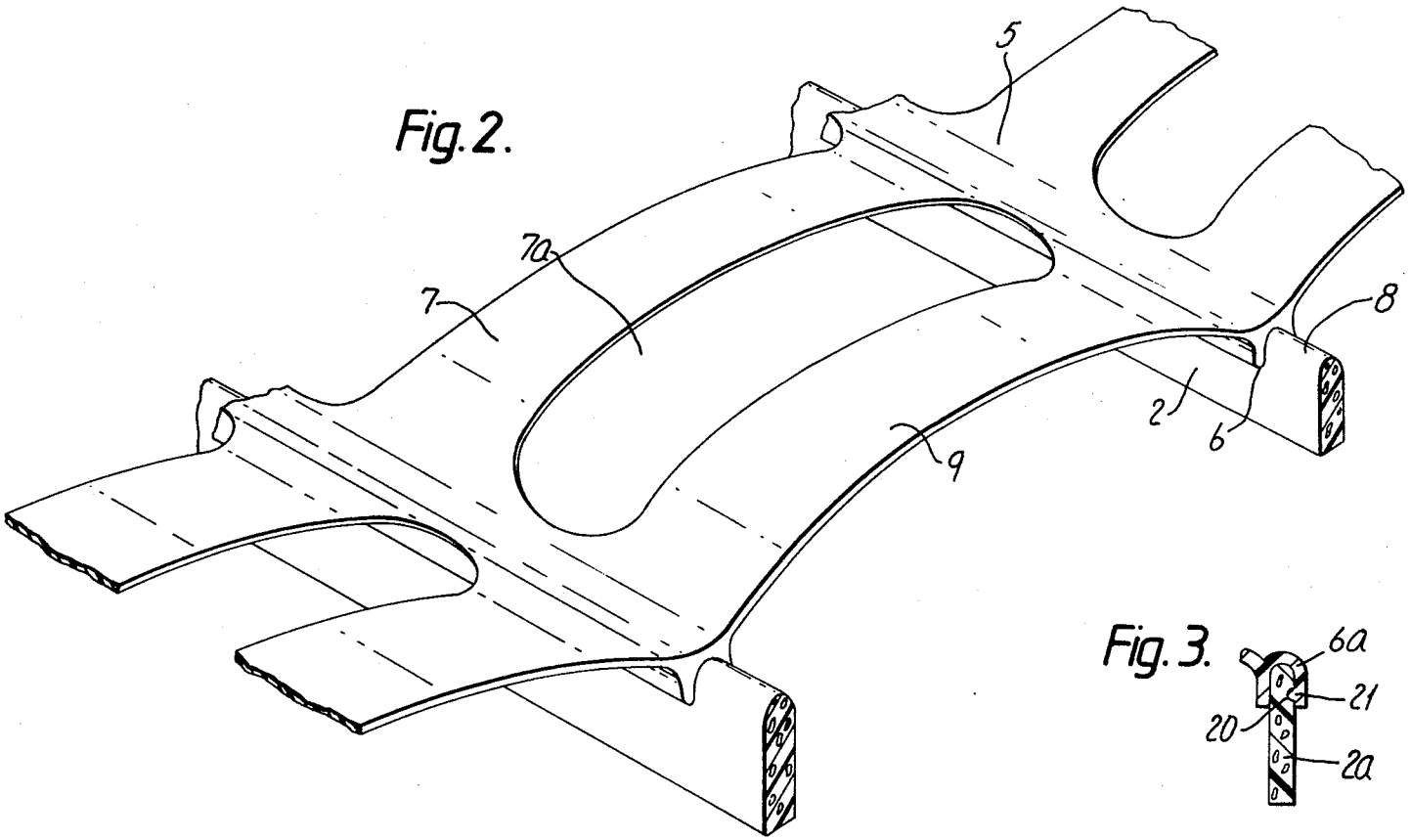
Figure 5:
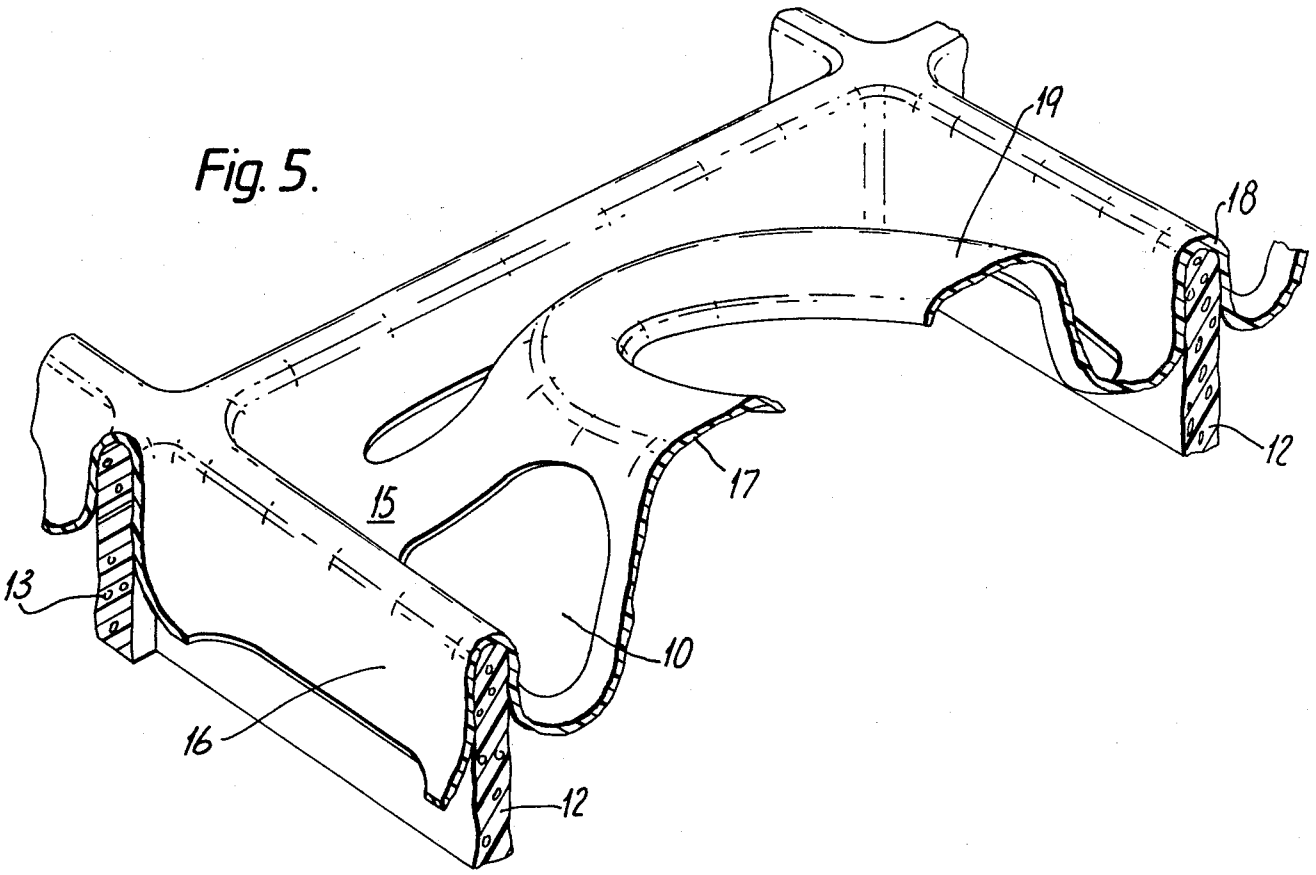
Figure 6:
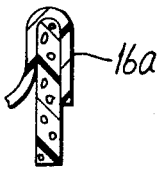
Figure 7:
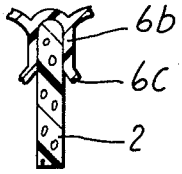
Figure 8:
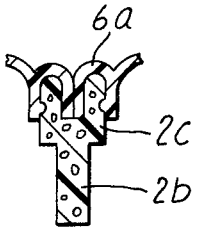
Figure 9:
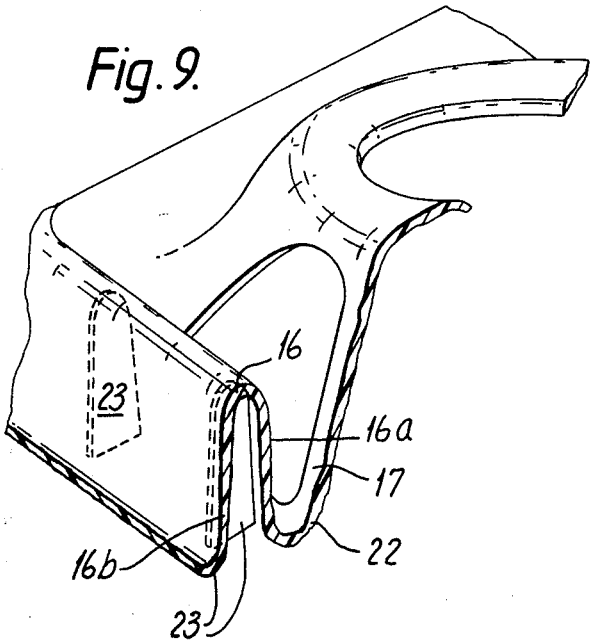
Figure 10:
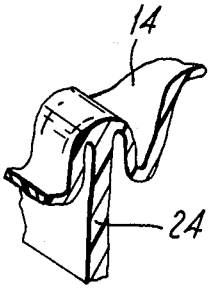

United States Defensive Publication [19] (H) [11] T101,501

Robinson [43] Feb. 2, 1982

[54] LIGHT-WEIGHT BASE FOR A BED

[76] Inventor: James D. Robinson, 3 The Jinnings, Welwyn Garden City, Hertfordshire, England

[21] Appl. No.: 127,303

[22] Filed: Mar. 5, 1980

[30] Foreign Application Priority Data

Dec. 21, 1979 [GB] United Kingdom ..... 44209/79

[51] Int. Cl.[3] ..... A47C 19/02

[52] U.S. Cl. ..... 5/186 R; 5/237

[57] ABSTRACT

A light-weight base for a bed is described which includes a mattress-supporting platform (4) supported on a frame (1) of opposed ribs (2) in which the platform (4) is formed from an array of resiliently depressible crested thermoplastics bridges (5) which act as springs and which extend between pairs of opposed ribs (2) and their crests rise above the tops of ribs (2). Bridges (5) may be conveniently injection molded from crystalline polypropylene or propylene/ethylene copolymer in sections 0.5 to 5 mm thick and are preferably integral with fixing means (6) which make push fits into ribs (2). The polypropylene bridges have good resistance to flexing fatigue, are light-weight and, when provided with integral fixing means, are easily assembled on frame (1). These modified bases may be used as seat or back portions of chairs as well.

7 Claims, 4 Sheets Drawing,

8 Pages Specification

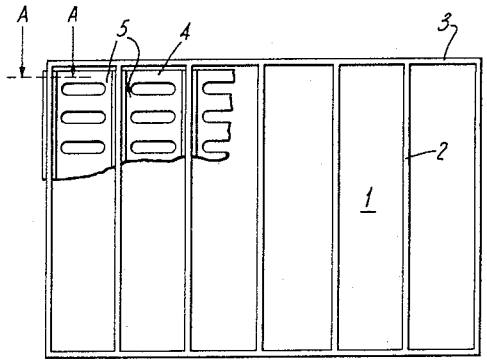

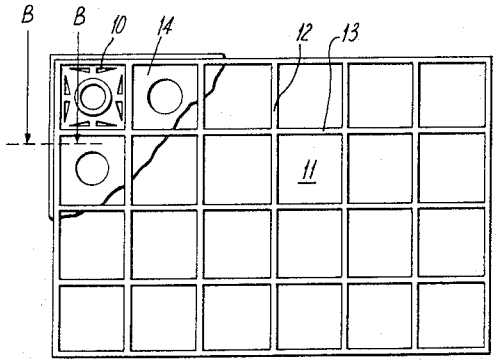

The file of this unexamined application may be inspected and copies thereof may be purchased (849 O.G. 1221, Apr. 9, 1968).